(12) United States Patent
Lessman et al.

(10) Patent No.: US 11,892,965 B2
(45) Date of Patent: Feb. 6, 2024

(54) ROUTING AND CONVERTING TRAFFIC BASED ON COMMUNICATION PROTOCOLS

(71) Applicant: Hewlett-Packard Development Company, L.P., Spring, TX (US)

(72) Inventors: Mark A Lessman, Fort Collins, CO (US); Glen Douglas Dower, Fort Collins, CO (US); Christopher Tabarez, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/413,903

(22) PCT Filed: Jul. 9, 2019

(86) PCT No.: PCT/US2019/040953
§ 371 (c)(1),
(2) Date: Jun. 14, 2021

(87) PCT Pub. No.: WO2021/006878
PCT Pub. Date: Jan. 14, 2021

(65) Prior Publication Data
US 2022/0398210 A1 Dec. 15, 2022

(51) Int. Cl.
*G06F 13/42* (2006.01)
*G06F 13/38* (2006.01)
*G06F 13/40* (2006.01)

(52) U.S. Cl.
CPC ........ *G06F 13/4282* (2013.01); *G06F 13/382* (2013.01); *G06F 13/4027* (2013.01); *G06F 2213/4004* (2013.01)

(58) Field of Classification Search
CPC . G06F 13/4282; G06F 13/382; G06F 13/4027
See application file for complete search history.

(56) References Cited

U.S. PATENT DOCUMENTS

| 7,788,428 | B2 | 8/2010 | Melin |
| 7,921,233 | B2 | 4/2011 | Chung |
| 8,347,017 | B2 | 1/2013 | Tseng |
| 8,510,494 | B2 | 8/2013 | Pietri et al. |

(Continued)

FOREIGN PATENT DOCUMENTS

| CN | 104020534 B | 1/2016 |
| EP | 2682872 B1 | 11/2016 |

(Continued)

*Primary Examiner* — Henry Tsai
*Assistant Examiner* — Christopher A Daley
(74) *Attorney, Agent, or Firm* — Quarles & Brady LLP

(57) ABSTRACT

In an example in accordance with the present disclosure, a system is described that includes a hub for routing data traffic between a first computing device and a second computing device. A detection device of the system detects a communication protocol between the computing devices. A switch of the system routes traffic directly between the computing devices when a first communication protocol is detected. When a second communication protocol is detected, the switch re-routes traffic of the first type from the first computing device back to the hub to convert the traffic of the first type to a second type and routes converted traffic directly to the second computing device.

15 Claims, 6 Drawing Sheets

(56) References Cited

U.S. PATENT DOCUMENTS

| | | |
|---|---|---|
| 8,799,537 B1 | 8/2014 | Zhu et al. |
| 10,152,446 B2 * | 12/2018 | Iyer ..................... G06F 13/4022 |
| 10,372,652 B2 * | 8/2019 | Yu ....................... G06F 13/4027 |
| 2012/0290761 A1 | 11/2012 | Chen et al. |
| 2013/0179604 A1 * | 7/2013 | Lai ...................... G06F 11/3068 |
| | | 710/16 |
| 2014/0047142 A1 | 2/2014 | Lai et al. |
| 2015/0381437 A1 * | 12/2015 | Perez ..................... H04W 4/80 |
| | | 709/219 |
| 2016/0179731 A1 * | 6/2016 | Fanson ................. H04L 12/403 |
| | | 710/306 |
| 2019/0108148 A1 | 4/2019 | Paganini et al. |
| 2021/0192088 A1 * | 6/2021 | Mcgibney ............... G06F 21/82 |

FOREIGN PATENT DOCUMENTS

| | | | |
|---|---|---|---|
| WO | 2019/079495 A1 | 4/2019 | |
| WO | WO2019079495 A1 * | 4/2019 | ............. G06F 13/38 |

* cited by examiner

ROUTING AND CONVERTING TRAFFIC BASED ON COMMUNICATION PROTOCOLS

BACKGROUND

Enhanced reality systems allow a user to become immersed in an enhanced reality environment wherein they can interact with the enhanced environment. For example, a head-mounted display, using stereoscopic display devices, allows a user to see, and become immersed in, any desired virtual scene. Such enhanced reality applications can provide visual stimuli, auditory stimuli, and/or can track user movement to create a rich immersive experience.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
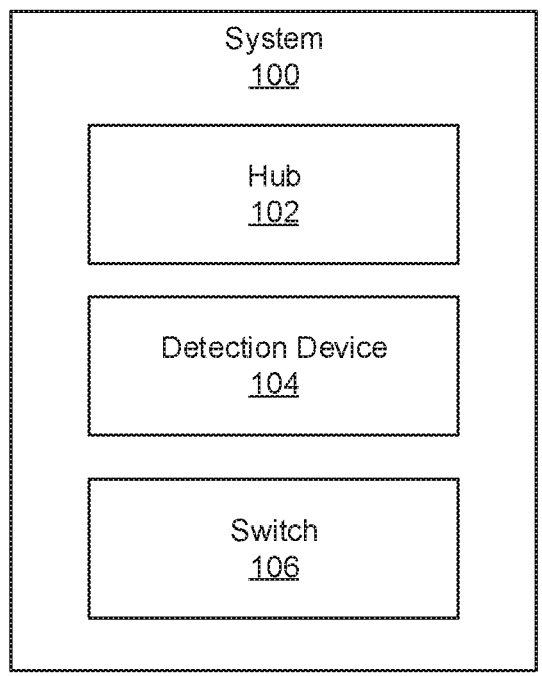
FIG. 1 is a block diagram of a system for routing and converting traffic based on communication protocols, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Enhanced reality systems allow a user to become immersed in an enhanced reality environment wherein they can interact with the enhanced environment. Enhanced reality systems include virtual reality (VR) systems, augmented reality (AR) systems, and mixed reality (MR) systems. Such enhanced reality systems can include enhanced reality headsets to generate realistic images, sounds, and other human discernable sensations that simulate a user's physical presence in a virtual environment presented at the headset. A VR system includes physical spaces and/or multi-projected environments. AR systems may include those systems and devices that implement live direct and/or indirect displays of a physical, real-world environment whose elements are augmented by computer-generated sensory input such as sound, video, graphics and/or GPS data. MR systems merge real and virtual worlds to produce new environments and visualizations where physical and digital objects co-exist and interact in real time. For simplicity, VR systems, AR systems, and MR systems are referred to herein as enhanced reality systems.

Such enhanced reality systems provide countless hours of diversion and also provide new forms of digital interaction. However, some developments may further enhance their implementation in society. For example, enhanced reality systems have certain unique operating characteristics. As an example, such enhanced reality systems transmit large amounts of video data such that a high-speed video channel is desirable. Moreover, as enhanced reality systems continue to develop, a communication path between the enhanced reality headset and the computing device may implement a high-speed channel for additional added functionality. Accordingly, as enhanced reality systems transmit video and other data at high data rates, data transmission paths may be a bottleneck to further immersive experiences. Particular communication protocols may exist that specifically target high-end virtual and mixed reality systems. For example, the VIRTUALLINK® protocol implements a universal serial bus (USB) type-c connection in an alternate mode. In general, a USB type-c connection includes four lanes for high speed data traffic and one lane for lower speed (i.e., USB 2) data traffic. The USB type-c connection also allows, for 1, 2, or 4 of the high-speed lanes to be dedicated for high speed video transport, in a display port mode.

The USB type-c connection also supports USB 3. In this case, the low speed lane and one of the high-speed lanes are reserved for USB 3 traffic. Accordingly, USB 3 is facilitated by a USB type-c connection when just one or two of the high-speed lanes are used for the high-speed video traffic. However, if four high speed lanes are desired to be used for video traffic, as may be the case in enhanced reality settings where high quantities of video data are transmitted, the USB type-c connection does not support the four high speed lanes being used for video traffic and USB 3.

Accordingly, the VIRTUALLINK® protocol may provide a device with a high-speed USB channel, such as a USB 3 channel, along with four lanes of display traffic. This is done by replacing the USB 2 signaling pins on a USB type-C connector with signaling for USB 3. The use of the higher-performance USB 3 channel, as compared to a USB 2 channel, enables high-bandwidth features of tethered enhanced reality headsets.

However, by swapping USB 2 for USB 3, the connector is no longer compliant with certain regulations for USB type-c connectors and therefore cannot be used interchangeably with standard type-c host ports. Moreover, USB 2 is no longer supported via this connector. That is, although the connector itself is the same, the different protocol could cause a defect in the enhanced reality systems and/or the host computing device. In this scenario, users could experience confusion since the connector is USB type-c, which is a physical port used for many devices. Attaching a device using the enhanced reality specific protocol to a standard type-USB c port may result in complete loss of USB function for that port.

While certain host devices may be able to support such a protocol, the cost of implementation may be high. Accordingly, the present system provides a user with a clean cabling solution regardless of host system support of different communication protocols.

Accordingly, the present specification describes a translator that converts the traffic. In an example, traffic is converted from USB 2 to USB 3. In another example, the present specification describes a high-speed multiplexing switch that is capable of switching USB 2 D+/D− signals to redirect/convert USB 2 traffic when there is no USB 2 connection, for example when a VIRTUALLINK® protocol is used.

That is, under one mode of operation USB 2 traffic is routed from the enhanced reality device directly to the cable where it is connected to USB 2 physical wires to the host. In another mode of operation, for example in the case where the USB 2 pins have been modified with USB 3 pins, the multiplexer re-directs USB 2 traffic to a translator, which converts the USB 2 traffic to USB 3 protocol. This USB 3 translated traffic is looped back to a downstream port of the hub, which in turn passes the USB 3 translated traffic to the upstream port, then through the cable using USB 3 physical wires to the host. The decision to switch the multiplexer may be derived in an embedded processor based on connectivity of the port. In an example, a passive solution may be implemented that uses existing USB signals or a simple signal manipulation in the cable itself (for example, tie one pin to ground for one cable type, and leave floating for the other cable type).

Specifically, the present specification describes a system. The system includes a hub for routing data traffic between a first computing device and a second computing device. A detection device of the system detects a communication protocol between the computing devices. A switch of the system routes traffic directly between the computing devices when a first communication protocol is detected. When a second communication protocol is detected, the switch 1) re-routes traffic of the first type from the first computing device to a translator to convert the traffic of the first type to a second type and 2) passes converted traffic directly to the second computing device.

The present specification also describes a method of routing and converting traffic. According to the method, a communication protocol is detected between a first computing device and a second computing device. When a first communication protocol is detected, the system establishes a direct data transmission path through a first port of a hub between the first computing device and the second computing device for traffic of a first type. By comparison, when a second communication protocol is detected, the system re-routes the traffic of the first type to a dedicated downstream port of the hub. Along the way, the traffic of the first type is converted to a second type.

Based on the detected protocol, a switch is managed accordingly. In an example, the protocol is detected via a microcontroller, but may be done in other ways such as a simple cable connection bit and/or using an existing USB controller.

The present specification also describes an enhanced reality headset. The enhanced reality headset includes a hub. The hub includes an upstream port to 1) selectively transmit universal serial bus (USB) 2 traffic directly to the host computing device and 2) transmit USB 3 traffic directly to the host computing device. The hub also includes a first downstream port to receive traffic from a component of the enhanced reality headset. A second downstream port of the hub receives, and transmits to the upstream port, converted USB 3 traffic. The enhanced reality headset also includes a microcontroller to detect a communication protocol between the host computing device and the enhanced reality headset. A switch of the enhanced reality headset routes traffic directly to the host computing device through the upstream port when a first communication protocol is detected. When a second communication protocol is detected, the switch re-routes the USB 2 traffic from the component to the second downstream port. The enhanced reality headset also includes a translator to, during re-routing of the USB 2 traffic, convert the USB 2 traffic to USB 3 traffic.

In summary, using such a system may 1) provide the freedom to connect via a single data cable and use different communication protocols via the single data cable; 2) reduce user confusion which may lead to damage to either of a host computing device or a coupled peripheral device such as an enhanced reality headset; 3) address functional issues caused by conversion of USB 2 to USB 3.0; and 4) provide for a fully-compliant downstream open port, as examples. However, it is contemplated that the devices disclosed herein may address other matters and deficiencies in a number of technical areas.

For example, devices expecting to operate on USB 2 may have issues on the host computer side because of nuances in the driver or hardware that present an issue. These issues may be overcome by applying fixes in their computer readable program code that are specific to the issue encountered. Accordingly, devices may have a customized program code fix to function properly across the converter. This process of "whitelisting" is an additional complexity during design, and it also makes it difficult to have a downstream port that is open to a user to apply any device they desire as it may not have an associated program code fix. Therefore, the USB 2-connected devices in a computing device may be limited to a known set, rather than allowing for new devices to be attached.

As used in the present specification and in the appended claims, the term "a number of" or similar language is meant to be understood broadly as any positive number including 1 to infinity.

Turning now to the figures, FIG. 1 is a block diagram of a system (100) for routing and converting traffic based on communication protocols, according to an example of the principles described herein. In general, the system (100) may be disposed on any variety of computing devices. Such computing devices include mobile phones, desktop computers, laptop computers, servers, tablet devices, gaming systems, smart home devices, and others. In an example, the system (100) is disposed in an enhanced reality headset that generates an enhanced environment such as a virtual environment, a mixed environment, and/or an augmented environment.

As described above, different computing devices may communicate through different protocols. The different protocols may support different types of traffic. Examples of different types of traffic include USB 2 and USB 3. Accordingly, a first protocol may support data traffic of the first type (i.e., USB 2) and the second type (i.e., USB 3) and a second protocol may support data traffic of just the second type (i.e., USB 3) and not the first type (i.e., USB 2) to allow for more lanes of high speed video traffic. The system (100) described herein provides for the conversion of one type of traffic to another such that fewer data transmission paths may be used in any one computing device.

The system (100) includes a hub (102) that routes data traffic between a first computing device and a second computing device. That is, the hub (102) may include circuitry and other hardware components such as capacitors, resistors, and transistors that route information along any variety and combination of paths. Specifically, the hub (102) may include a port to interface with the first computing device and a separate port to interface with the second computing device. Through these ports data is received/transmitted to respective computing devices. As described above, the hub (102) and the system (100) in general, may be integrated into the first computing device which may be an enhanced reality headset.

The system includes a detection device (104) to detect a communication protocol between the computing devices. That is, the first computing device may be able to communicate via any number of communication protocols and the second computing device may or may not be able to communicate via those protocols. Accordingly, the detection device (104) determines which of the communication protocols is enabled. In an example, the detection device (104) is a microcontroller to determine which protocol is implemented. However, in other examples other mechanisms may be used such as a cable connection bit and/or an existing USB controller. That is a bit may be set which indicates a communication protocol along the transmission path.

In an example, the first computing device, which may be an enhanced reality headset may be able to communicate via multiple protocols, a first using four lanes for display traffic and one lane for USB 2 traffic and the second (i.e., VIRTUALLINK®) using four lanes for display traffic and one lane for USB 3 traffic. That is, one protocol communicates non-video data via USB 2 and the other protocol communicate non-video data using USB 3. Accordingly, the detection device (104) may determine with which of these protocols is implemented between the computing devices.

As described above, the detection device (104) may detect the communication protocol in any number of ways. In one example, the detection device (104) is a microcontroller. A microcontroller could be used to determine the implemented protocol in at least two ways. In an example, the microcontroller uses an input to detect which cable is attached. In this example, there could be a first cable for one communication protocol (i.e., a VIRTUALLINK® protocol) and a second cable for another communication protocol (i.e., a non VIRTUALLINK® protocol). One of these cables, for example the first cable could have a pin dedicated to identification, which pin may be tied to ground, for instance, to indicate to the microcontroller that a first communication protocol cable is attached. Therefore, the microcontroller could switch the data path accordingly. In another example, the microcontroller connects to the USB signals from the host computing device and uses USB training protocols to identify which links are active to the host computing device. For example, if the USB2 connection to the host computing device successfully trains, the microcontroller will know that the cable does not implement the VIRTUALLINK® protocol.

For example, the detection device (104) may detect the communication protocol based on a signal from an embedded processor based on a connectivity between the first computing device and the second computing device. In an example, the detection device (104) detects a communication protocol based on a signal manipulation of a data cable between the first computing device and the second computing device.

Accordingly, similar to the first method described above, i.e., the detection device (104) is a microcontroller, the cable could dedicate a pin to identifying the available protocol. In this example, rather than using a microcontroller to perform the switching of the data path, the cable pin connection could be formed to connect directly to the high-speed switch to properly set the data path.

In yet another example, the detection device (104) may include a USB controller chip that is modified to perform functions similar to the microcontroller example above. In this example, a manufacturer may incorporate extra general-purpose ports and design the detection device (104) to perform the function of controlling the high-speed switch to select data path in the same way as described for the microcontroller example.

As used in the present specification and in the appended claims, the term, "microcontroller" refers to various hardware components, which includes a processor and memory. The processor includes the hardware architecture to retrieve executable code from the memory and execute the executable code. As specific examples, the controller as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

Figure 4:
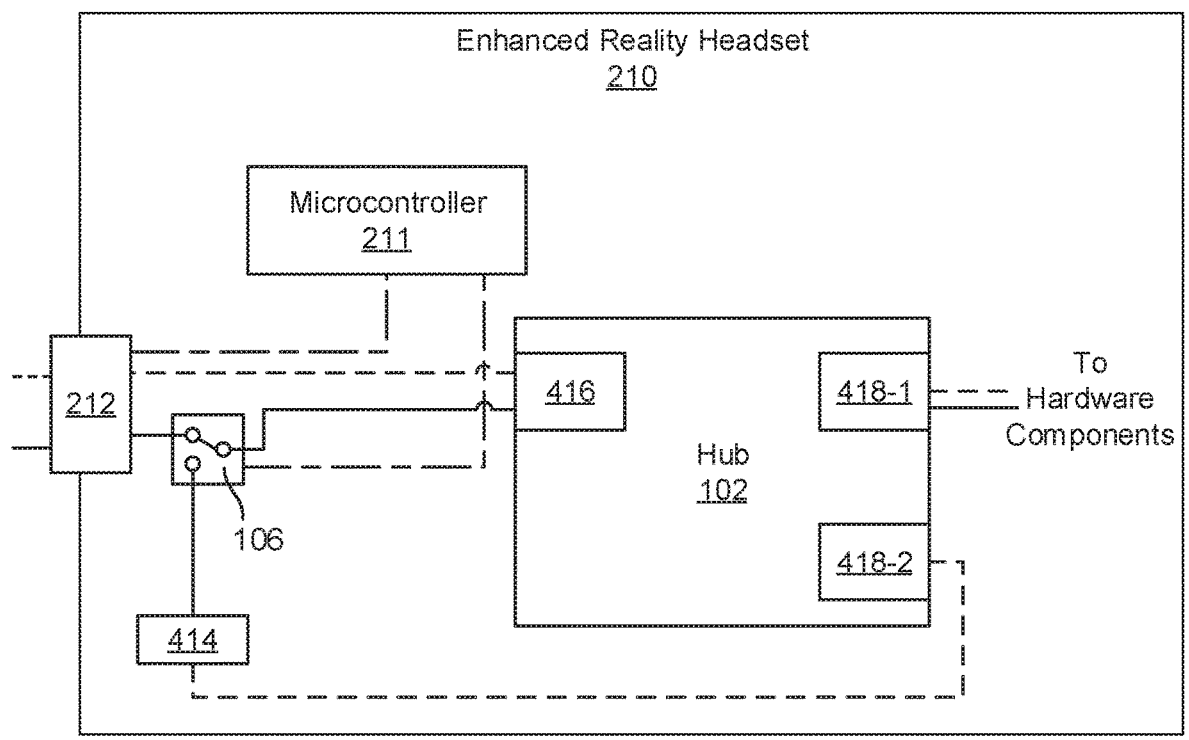
FIG. 4 is a diagram of a system for routing and converting traffic based on communication protocols, according to an example of the principles described herein.

The system (100) also includes a switch (106) to route data traffic based on a detected communication protocol. Specifically, if a first communication protocol, e.g., non VIRTUALLINK® protocol, is detected, traffic is routed directly. That is, it is passed such that the traffic of the first type passes through no additional components, other than the switch (106) between the first computing device and the hub (102). In this example, traffic of the second type may also be directly transmitted. FIG. 4 depicts an example of the system (100) when a first communication protocol is detected.

By comparison, when a second communication protocol, e.g., a VIRTUALLINK® protocol, is detected, the switch (106) re-routes traffic of the first type from the first computing device to a translator. That is, rather than the traffic traveling directly to its destination, i.e., the host computing device, it is "re-routed" back to the hub (102), passing by a translator along this re-routed path. In some examples, the term re-routing refers to a directing of traffic through a translator before it goes to its intended destination. This may occur because the second communication protocol does not support the first data type even though data of the first type is still received from the first computing device (i.e., enhanced reality headset) at the hub (102).

During this re-routing, the traffic of the first type is converted into a second type. The converted traffic, after it has reached the hub (102), is then passed directly to the second computing device.

Figure 5:
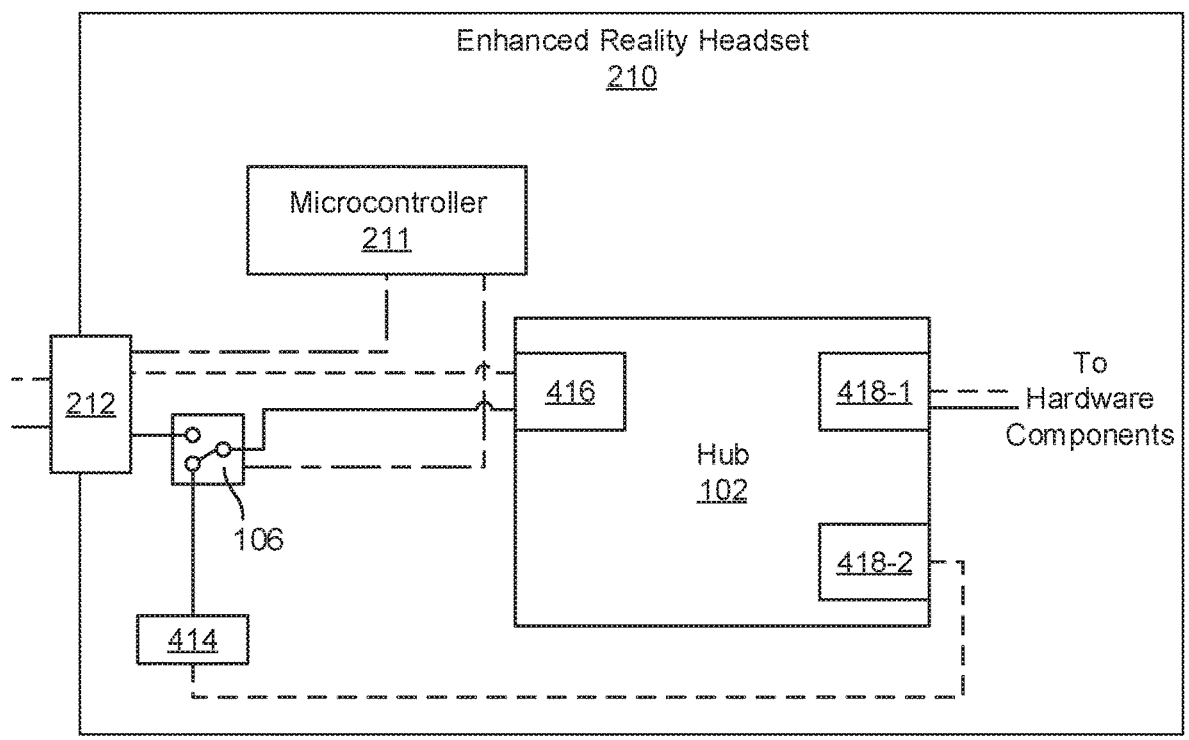
FIG. 5 is a diagram of a system for routing and converting traffic based on communication protocols, according to another example of the principles described herein.

Still further in this example, when the second communication protocol is detected, traffic of the second type from the second computing device is re-routed, that is altered from a direct path to the host computing device, to the translator to convert the traffic of the second type to the first type. The converted traffic is then passed directly to the first computing device. FIG. 5 depicts the system (100) when a second protocol is detected.

Accordingly, in summary, regarding data traffic from a first computing device (i.e., an enhanced reality headset) towards a second computing device (i.e., a host computing device), if a first communication protocol is detected, data traffic of a first type passes directly from the hub (102) to the second computing device. By comparison, if a second communication protocol is detected data traffic of a first type passes indirectly from the hub (102) to the second computing device and along this indirect path the traffic of the first type is converted into a second type, after which it is transmitted.

Regarding data traffic from a second computing device (i.e., a host computing device) towards a first computing device (i.e., an enhanced reality headset), if a first communication protocol is detected, data traffic of a first type passes directly from the hub (102) to the second computing device. By comparison, if a second communication protocol is detected data traffic of a second type passes indirectly to the first computing device and along this indirect path the traffic of the second type is converted into a first type, after which it is transmitted. As described above, FIGS. 4 and 5 depict diagrammatic representations of these different scenarios.

Figure 2:
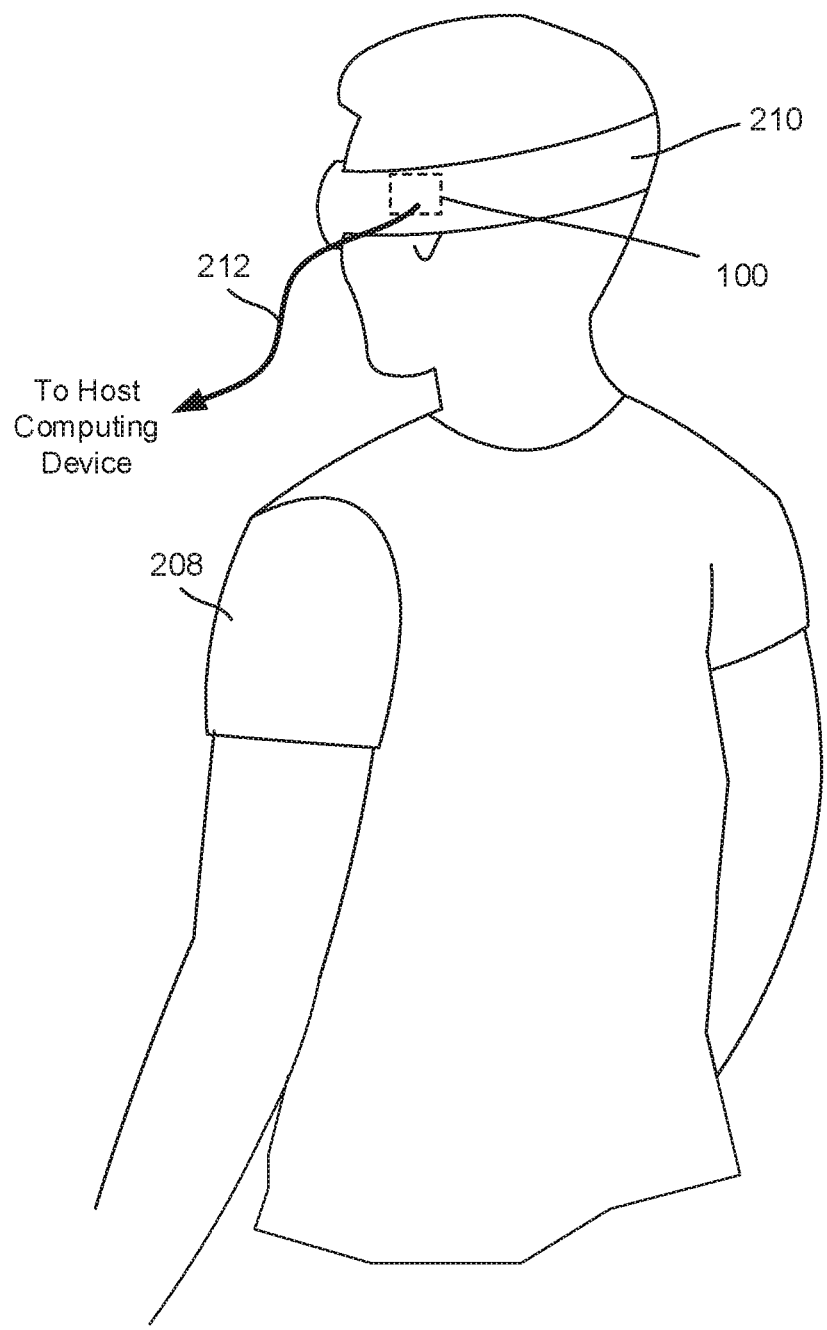
FIG. 2 is a diagram of an enhanced reality headset for routing and converting traffic based on communication protocols, according to an example of the principles described herein.

FIG. 2 is a diagram of an enhanced reality headset (210) for routing and converting traffic based on communication protocols, according to an example of the principles described herein. As described above, in some examples the first computing device is an enhanced reality headset (210) that is worn by a user (280) to generate visual, auditory, and other sensory environments, to detect user input, and to manipulate the environments based on the user input. While FIG. 2 depicts a particular configuration of the enhanced reality headset (210), any type of enhanced reality headset (210) may be used in accordance with the principles described herein.

In this example, the enhanced reality headset (210) is communicatively coupled to a host computing device such that execution of computer readable program code by a processor associated with the host computing device causes a view of an enhanced reality environment to be displayed in the enhanced reality headset (210). In some examples, the enhanced reality headset (210) implements a stereoscopic head-mounted display that provides separate images for each eye of the user. In some examples, the enhanced reality headset (210) may provide stereo sound to the user. In an example, the enhanced reality headset (210) may include a head motion tracking sensor that includes a gyroscope and/or an accelerometer. The enhanced reality headset (210) may also include an eye tracking sensor to track the eye movement of the user of the enhanced reality headset (210).

As described above, the enhanced reality headset (210) may include the system (100) which includes components for routing and converting traffic to and from the enhanced reality headset (210). That is, user input from any of the above-mentioned sensors may be passed through a data cable (212) to the host computing device such that the enhanced environments may be manipulated based on the user input. Similarly, traffic may pass from the host computing device to the enhanced reality headset (210) via the data cable (212) to generate the visual, auditory, and/or other sensory environment. In some examples, the data cable (212) may be integrated with the enhanced reality headset (210). That is, the data cable (212) may not be a separate component from the enhanced reality headset (210).

In some examples, the first communication protocol and the second communication protocol may be transmitted via a single data cable (212). That is, regardless of the type of traffic transmitted to and from the host computing device, a single data cable (212) may be used. For example, a single data cable (212) may facilitate four lanes of display traffic and may have an additional lane. This additional lane may support either of USB 2 traffic or USB 3 traffic. Accordingly, whatever communication protocol is enabled (e.g., USB 2 traffic protocol or USB 3 traffic protocol), either data may still be transmitted along the single data cable (212).

Figure 3:
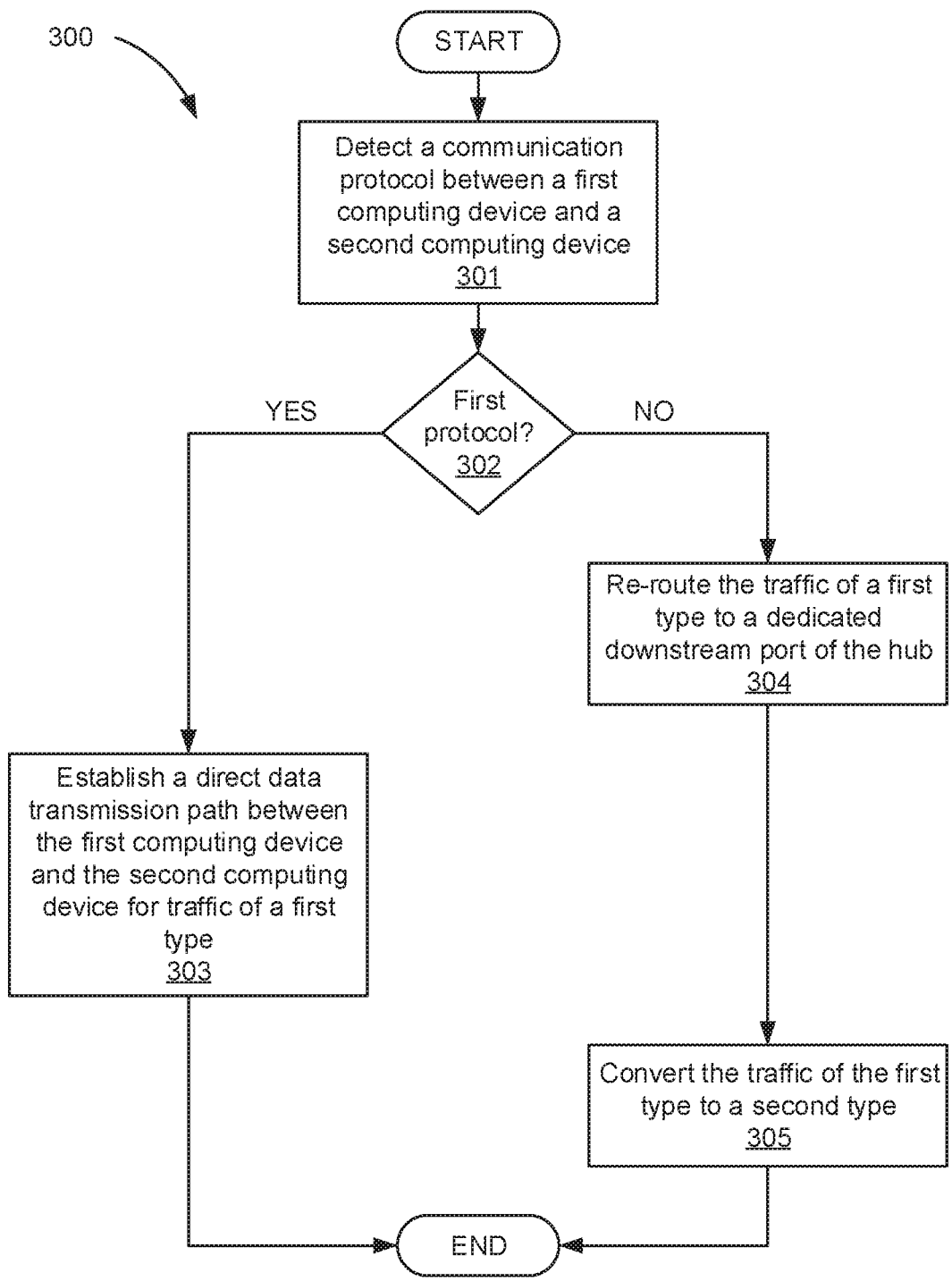
FIG. 3 is a flowchart of a method for routing and converting traffic based on communication protocols, according to an example of the principles described herein.

FIG. 3 is a flowchart of a method (300) for routing and converting traffic based on communication protocols, according to an example of the principles described herein. Accordingly, a communication protocol is detected (block 301) between a first computing device and a second computing device. That is, different computing devices may enable communication via different, and in some cases multiple, communication protocols. As a specific example, an enhanced reality headset (FIG. 2, 210) may transmit/receive traffic of a first type, which may be USB 2 traffic, and may also enable transmission/reception of traffic of a second type, which may be USB 3 traffic. That is, the enhanced reality headset (FIG. 2, 210) may have components that transmit via USB 2 and others that transmit via USB 3. In some examples, the communication protocol detected between the host computing device and the enhanced reality headset (FIG. 2, 210) may not support one of these data traffic types. For example, a particular protocol may not support USB 2 in favor of facilitating four lanes of display traffic and USB 3 traffic.

If it is detected that the communication protocol is a first communication protocol (block 302, determination YES), which as described above, may facilitate USB 2 traffic, the method (300) includes establishing (block 303) a direct data transmission path through an upstream port of the hub (FIG. 1, 102). As described above, the hub (FIG. 1, 102) is between the first computing device and the second computing device components. Specifically, this direct transmission path established (block 303) based on a detected first communication protocol may allow for direct transmission of data of a first type.

By comparison, when a second communication protocol is detected (block 302, determination NO), which as described above may facilitate USB 3 traffic but not USB 2 traffic, traffic is re-routed (block 304) to a downstream port of the hub (FIG. 1, 102). That is, this traffic is re-directed from the host computing device towards a translator. Such re-routing may be triggered via action of the switch (FIG. 1, 106). Along this re-routed path, that is the path including the translator, traffic of the first type is converted (block 305) into a second type. Specifically, this traffic is re-routed (block 304) to a dedicated downstream port whose function is to receive the converted traffic.

According to the method (300), traffic is received at the hub (FIG. 1, 102) from a component of the enhanced reality headset (FIG. 2, 210) as either of the first type (i.e., USB 2) or the second type (i.e., USB 3). If it is of the first type (i.e., USB 2), and the communication protocol detected on the second computing device does not support the first type (i.e., USB 2) but just the second type (i.e., USB 3), the traffic is re-routed—that is directed towards a translator, converted to the second type (i.e., USB 3), and then output to the second computing device. If it is of the first type (i.e., USB 2), and the communication protocol detected on the second computing device does support the first type (i.e., USB 2), the traffic is directly passed to the second computing device.

Thus, the present method (300) accommodates transmission of data via any number of protocols, all with a single data cable (FIG. 2, 212), by converting and directing non-compliant traffic to comply with the communication protocol detected on the second computing device.

FIG. 4 is a diagram of an enhanced reality headset (210) for routing and converting traffic based on communication protocols, according to an example of the principles described herein. While the examples depicted in FIGS. 4 and 5 reference USB 2 as data of the first type and USB 3 as data of the second type, different specific types of data may be implemented herein.

Specifically, FIG. 4 depicts the hub (102) which routes traffic to and from the host computing device, the microcontroller (211) which detects the communication protocol between the host computing device and the enhanced reality headset, and the switch (106) which routes the traffic based on a determined communication protocol. In some examples, the microcontroller (104) includes a physical device controller that receives an indication of the communication protocol from the host computing device.

In the example depicted in FIGS. 4 and 5, the solid lines indicate data transmission lines to facilitate a first type of traffic, specifically USB 2 traffic, dashed lines indicate data transmission lines to facilitate a second type of traffic, specifically USB 3 traffic, and dashed-dot lines to and from the microcontroller (104) indicate a configuration channel traffic by which the communication protocol of the host computing device is determined and by which the switch (106) is correspondingly activated.

In this example, the hub (102) includes additional components. Specifically, the hub (102) includes an upstream port (416) which selectively transmits USB 2 traffic directly to/from the host computing device. That is, in some cases, USB 2 traffic is directly transmitted to/from the host computing device and in others it is indirectly transmitted to/from the host computing device via the translator (414) and second downstream port (418-2). The upstream port (416) also transmits USB 3 traffic directly to the host computing device, when the host computing device so enables.

The hub (102) also includes a first downstream port (418-1) to receive traffic from a component of the enhanced reality headset (210) such as user (FIG. 2, 208) input sensors.

FIG. 4 depicts one operating mode of the enhanced reality headset (210), specifically where the microcontroller (211) detects a first communication protocol, i.e., that does support USB 2 traffic. Such a detection is made by the microcontroller (104) which sets the switch (106) as depicted in FIG. 4.

In this example, USB 2 traffic from the host computing device (as received along the data cable (212)) is passed directly to the upstream port (416) to the first downstream port (418-1) to hardware components of the enhanced reality headset (FIG. 2, 210). Similarly, USB 2 traffic from the component of the enhanced reality headset (FIG. 2, 210) is passed from the first downstream port (418-1) directly to the host computing device through the upstream port (416).

Note that this first communication protocol also supports USB 3 traffic so long as less than three high-speed lanes are used for display traffic such that one of the four lanes, in conjunction with the low speed lane of the USB type-c connector, is free for USB 3 traffic. Accordingly, in this example when less than three lanes of traffic are used for display traffic, USB 3 traffic from the host computing device (as received along the data cable (212) is passed directly to the upstream port (416) to the first downstream port (418-1) to hardware components of the enhanced reality headset (FIG. 2, 210). Similarly, USB 3 traffic from the components of the enhanced reality headset (FIG. 2, 210) is passed from the first downstream port (418-1) directly to the host computing device through the upstream port (416).

FIG. 5 is a diagram of an enhanced reality headset (210) for routing and converting traffic based on communication protocols, according to an example of the principles described herein. Specifically, FIG. 5 depicts the hub (102), microcontroller (211), and switch (106) as described above.

FIG. 5 depicts one operating mode of the enhanced reality headset (210), specifically where the microcontroller (211) detects a second communication protocol, i.e., that does support USB 3 traffic and does not support USB 2 traffic. Such a detection is made by the microcontroller (104) which sets the switch (106) as depicted in FIG. 5.

In this example, USB 3 traffic from the host computing device (as received along the data cable (212)) is passed directly to the upstream port (416) to the first downstream port (418-1) to hardware components of the enhanced reality headset (FIG. 2, 210). Similarly, USB 3 traffic from components of the enhanced reality headset (FIG. 2, 210) is passed from the first downstream port (418-1) directly to the host computing device through the upstream port (416).

However, other types of traffic may also be transmitted. For example, USB 2 traffic from the host computing device to the enhanced reality headset (210) components may be transmitted through the hub (102) via the switch (106) and USB 2 traffic from the enhanced reality headset (210) components may be transmitted through the hub (102) to the host computing device.

As the second communication protocol does not support USB 2 traffic, due to replacing USB 2 pins with USB 3 signaling, any USB 2 traffic is to be converted to USB 3 traffic. Accordingly, when the microcontroller (104) detects that the communication protocol just supports USB 3 traffic, it sets the switch (106) such that any USB 2 traffic output is passed to a translator (414) of the enhanced reality headset (210).

The translator (414) operates to, during re-routing of the USB 2 traffic, convert the USB 2 traffic to USB 3 traffic. Regarding the download of USB 2 traffic from the enhanced reality headset (20) to the host computing device, any USB 2 traffic is re-routed to the translator (414) via action of the switch (106).

In this example, the hub (102) includes a second downstream port (418-2). This second downstream port (418-2) is communicatively coupled to the translator (414) and receives the converted USB 3 traffic. The second downstream port (418-2) is communicatively coupled on the other end to the upstream port (416), such that the converted USB 3 traffic is transmitted to the upstream port (416) where it can then be directly transferred to the host computing device along the data cable (212).

Regarding the upload of USB 2 traffic from the host computing device to the enhanced reality headset (210), when four lanes of traffic are used for display traffic, some USB 3 traffic from the host computing device may be intended to be passed to a hardware component that communicate via USB 2. Accordingly, this USB 3 traffic should be converted. This to-be-converted USB 3 traffic is passed directly to the upstream port (416) to the second downstream port (418-2) which re-routes the USB 3 traffic to the translator (414) which converts it to USB 2 traffic and passes the converted traffic to the upstream port (416). The USB 3-to-USB 2 converted traffic is then passed to the first downstream port (418-1) and to hardware components of the enhanced reality headset (FIG. 2, 210).

Figure 6:
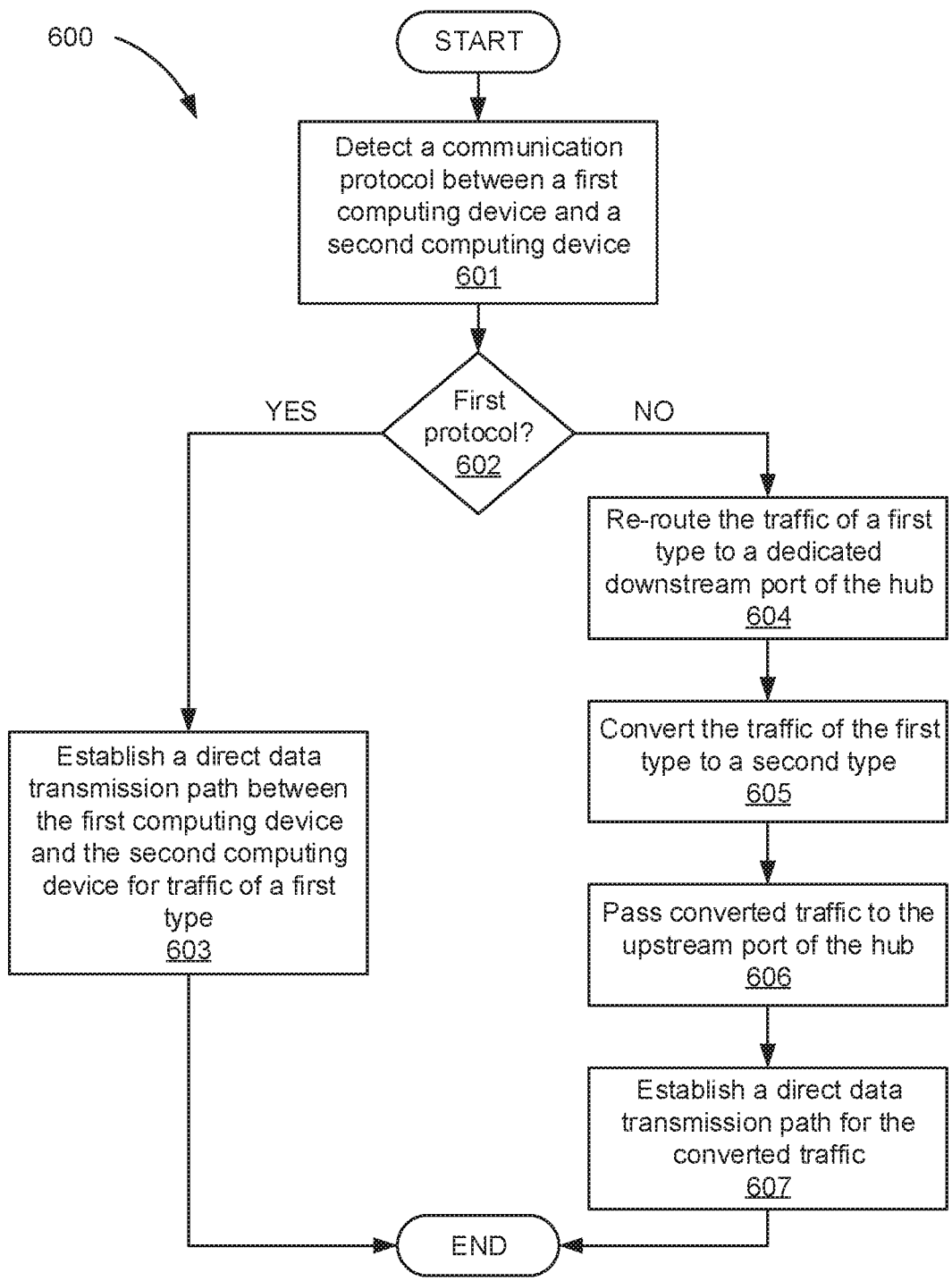
FIG. 6 is a flowchart of a method for routing and converting traffic based on communication protocols, according to an example of the principles described herein.

FIG. 6 is a flowchart of a method (600) for routing and converting traffic based on communication protocols, according to an example of the principles described herein. As described above, the method (600) includes detecting (block 601) a communication protocol between a second, or host, computing device and a first computing device and if a first communication protocol is detected (block 602, determination YES), a direct data transmission path is established (block 603) such that data of a first type (i.e., USB 2) is transmitted directly between the host computing device and the enhanced reality headset (FIG. 2, 210). This may be performed as described above in connection with FIG. 3.

In the case that the microcontroller (FIG. 2, 21) detects a second communication protocol (block 602, determination NO), all communication from the enhanced reality headset (FIG. 2, 210) that is of the first type (i.e., USB 2) traffic is to be converted to a second type (i.e., USB 3). To this end, the traffic of the first type is re-routed (block 604) to a dedicated downstream port (e.g., the second downstream port (FIG. 4, 418-2), of the hub and along the way it is converted (block 605) into the second type (i.e., into USB 3 traffic). These actions may also be performed as described above in connection with FIG. 3.

Once at the second, and dedicated, downstream port (FIG. 4, 418-2), the converted traffic is routed (block 606) to the upstream port (FIG. 4, 416). That is, circuitry electrically couples the second downstream port (FIG. 4, 418-2) to the upstream port (FIG. 4, 416) such that data may be transferred thereto. Once at the upstream port (FIG. 4, 416), the converted data, which is compatible with the previously detected communication protocol of the host computing device, is transmitted to the host computing device. That is, the method (600) includes establishing (block 607) a direct data transmission path through the upstream port (FIG. 4, 416) between the hub (FIG. 1, 102) and the host computing device. In summary, using such a system may 1) provide the freedom to connect via a single data cable and use different communication protocols via the single data cable; 2) reduce user confusion which may lead to damage to either of a host computing device or a coupled peripheral device such as an enhanced reality headset; 3) address functional issues caused by conversion of USB 2 to USB 3.0; and 4) provide for a fully-compliant downstream open port, as examples. However, it is contemplated that the devices disclosed herein may address other matters and deficiencies in a number of technical areas.

What is claimed is:

1. A system, comprising:
   a hub for routing data traffic between a first computing device and a second computing device;
   a detection device to detect a communication protocol between the computing devices; and
   a switch to:
      when a first communication protocol is detected, route traffic directly between the computing devices; and
      when a second communication protocol is detected:
         re-route traffic of a first type from the first computing device to a translator to convert the traffic of the first type to a second type; and
         pass converted traffic directly to the second computing device.

2. The system of claim 1, wherein when the second communication protocol is detected:
   re-route traffic of the second type from the second computing device to the translator to convert the traffic of the second type to the first type; and
   pass converted traffic directly to the first computing device.

3. The system of claim 1, wherein the system is integrated into the first computing device.

4. The system of claim 1, wherein:
   the first computing device is an enhanced reality headset; and
   the second computing device is a host computing device.

5. The system of claim 1, further comprising the translator to, during re-routing of the traffic of the first type, convert the traffic of the first type to traffic of the second type.

6. The system of claim 1, wherein the first communication protocol and the second communication protocol are transmitted via a single data cable.

7. The system of claim 6, wherein:
   the first communication protocol uses four lanes for display traffic and one lane for universal serial bus (USB) 2 traffic; and
   the second communication protocol uses four lanes for display traffic and one lane for USB 3 traffic.

8. The system of claim 1, wherein the detection device detects a communication protocol based on at least one of:
   a signal from an embedded processor based on a connectivity between the first computing device and the second computing device; and
   a signal manipulation of a data cable between the first computing device and the second computing device.

9. The system of claim 1, wherein when the second communication protocol is detected, the switch is further to:
   receive the traffic of the first type from the hub to re-route the traffic of the first type to the translator of the hub; and
   receive the converted traffic from the hub to pass the converted traffic directly to the second computing device, wherein the converted traffic is of the second type, is output by the translator, and includes the traffic of the first type after conversion by the translator to the second type.

10. A method, comprising:
    detecting a communication protocol between a first computing device and a second computing device;
    when a first communication protocol is detected, establishing a direct data transmission path through a first port of a hub between the first computing device and the second computing device for traffic of a second type;
    when a second communication protocol is detected:
       receiving, at a switch, traffic of a first type to re-route the traffic of the first type;
       re-routing the traffic of the first type to a dedicated downstream port of the hub;
       converting the traffic of the first type to the second type along the way;
       receiving, at the switch, the converted traffic from the hub, wherein the converted traffic is of the second type and includes the traffic of the first type after conversion to the second type; and
       passing converted traffic to the first port.

11. The method of claim 10, further comprising establishing a direct data transmission path through the first port of the hub between the first computing device and the second computing device for the converted traffic.

12. An enhanced reality headset, comprising:
    a hub comprising:
       an upstream port to:
          selectively transmit universal serial bus (USB) 2 traffic directly to a host computing device; and
          transmit USB 3 traffic directly to the host computing device;
       a first downstream port to receive traffic from a component of the enhanced reality headset;

a second downstream port to receive, and transmit to the upstream port, converted USB 3 traffic;

a microcontroller to detect a communication protocol between the host computing device and the enhanced reality headset;

a switch to:
　when a first communication protocol is detected, route traffic directly to the host computing device through the upstream port; and
　when a second communication protocol is detected, receive the USB 2 traffic to re-route the USB 2 traffic;
　　re-route the USB 2 traffic from the component to the second downstream port;
　　receive the USB 3 traffic converted from the USB 2 traffic; and
a translator to, during re-routing of the USB 2 traffic, convert the USB 2 traffic to USB 3 traffic.

13. The enhanced reality headset of claim 12, wherein, when a second communication protocol is detected:
　USB 3 traffic from the host computing device is re-routed to the second downstream port; and
　the translator, during re-routing of the USB 3 traffic, is to convert the USB 3 traffic to USB 2 traffic.

14. The enhanced reality headset of claim 12, further comprising a data cable integrally coupled to the upstream port.

15. The enhanced reality headset of claim 12, wherein the microcontroller comprises a physical device controller to receive an indication of the communication protocol from the host computing device.

\* \* \* \* \*